(12) United States Patent
Nugent

(10) Patent No.: US 11,187,258 B2
(45) Date of Patent: Nov. 30, 2021

(54) FIXING KIT AND METHOD

(71) Applicant: Simon Andrew Nugent, Birmingham (GB)

(72) Inventor: Simon Andrew Nugent, Birmingham (GB)

( * ) Notice: Subject to any disclaimer, the term of this patent is extended or adjusted under 35 U.S.C. 154(b) by 56 days.

(21) Appl. No.: 16/499,591

(22) PCT Filed: Mar. 28, 2018

(86) PCT No.: PCT/GB2018/050853
§ 371 (c)(1),
(2) Date: Sep. 30, 2019

(87) PCT Pub. No.: WO2018/178698
PCT Pub. Date: Oct. 4, 2018

(65) Prior Publication Data
US 2020/0096030 A1 Mar. 26, 2020

(30) Foreign Application Priority Data

Mar. 30, 2017 (GB) .................................... 1705109
Dec. 8, 2017 (GB) .................................... 1720501

(51) Int. Cl.
*F16B 13/08* (2006.01)
*F16B 13/00* (2006.01)
*F16B 13/04* (2006.01)
*F16B 2/12* (2006.01)

(52) U.S. Cl.
CPC .............................. *F16B 13/0833* (2013.01)

(58) Field of Classification Search
CPC ...... F16B 13/0833; F16B 13/001; F16B 2/12; F16B 13/04
See application file for complete search history.

(56) References Cited

U.S. PATENT DOCUMENTS

| 9,279,440 | B2 | 3/2016 | Daykin | |
| 2003/0127578 | A1* | 7/2003 | Skorka | .................... A47G 1/20 |
| | | | | 248/475.1 |
| 2012/0056051 | A1 | 3/2012 | Gold | |
| 2016/0084287 | A1 | 3/2016 | Daykin | |

FOREIGN PATENT DOCUMENTS

| AU | 2015227400 | 4/2019 |
| CN | 105715011 | 2/2016 |
| EP | 0989309 | 3/2000 |

(Continued)

*Primary Examiner* — Bayan Salone
(74) *Attorney, Agent, or Firm* — J. Wiley Horton

(57) ABSTRACT

A fixing for attaching an object to a panel, the fixing comprising: a head member (11) configured to be located on a first side of the panel; a back member (13) configured to be located on a second side of the panel and to receive at least part of an attachment element; and a neck member (12) connecting the head member (11) and the back member (13), wherein the head member (11), neck member (12), and back member (13) are rigidly coupled together and a part of the back member extends radially outwardly with respect to the head member, such that the back member is locatable on the second side of the panel by manipulation of the rigidly coupled head member, neck member and back member.

22 Claims, 13 Drawing Sheets

(56) References Cited

FOREIGN PATENT DOCUMENTS

| | | |
|---|---|---|
| EP | 2998592 | 3/2016 |
| GB | 2484771 | 8/2011 |
| GB | 2530303 | 9/2014 |
| WO | WO9906717 | 2/1999 |
| WO | WO 00/25030 | 5/2000 |
| WO | WO0153706 | 7/2001 |

\* cited by examiner

FIXING KIT AND METHOD

CROSS-REFERENCES TO RELATED APPLICATIONS

This application is a U.S. National Stage Filing made pursuant to the provisions of 35 U.S.C. § 371. This application claims priority to PCT/GB2018/050853.

STATEMENT REGARDING FEDERALLY SPONSORED RESEARCH OR DEVELOPMENT

Not applicable

MICROFICHE APPENDIX

Not applicable

BACKGROUND OF THE INVENTION

1. Field of the Invention

This invention relates to the field of mounting hardware. Embodiments of the present invention relate to a fixing for attaching an object to a panel, a kit including the fixing, and a method for using the fixing, in particular, some embodiments relate to a plasterboard fixing, kit, and associated method.

2. Description of the Related Art

It is often necessary to secure another object to a panel. For example, many modern buildings include internal walls which are constructed using plasterboard (also known as drywall). Such walls typically comprise sheets of gypsum-based material supported by wooden battens.

In many such buildings there is a desire to secure objects to the internal walls. These objects can be relatively light (e.g. decorative objects such as pictures) or may be relatively heavy (e.g. internal fittings and fixtures such as cupboards and radiators).

An array of different fixings has been developed for different objects and object types, for use with plasterboard walls. These fixings include wall plugs (sometimes called screw anchors or Rawlplugs®) formed of plastic material such as nylon. To use such a fixing, a hole is drilled in the plasterboard, the wall plug is then inserted into the hole, and a suitable screw inserted into the wall plug (e.g. through at least part of the object to be secured to the wall). The screw causes expansion of the wall plug to grip the plasterboard. However, because the plasterboard is relatively thin, such wall plugs will typically include one or more resilient arms which are configured to be in a retracted state to allow the wall plug to be inserted. These arms then move outwardly to engage a rear of the plasterboard once inserted.

Other fixings include self-tapping threaded plastic plugs which can be engaged with the plasterboard and rotated into a secure position before, in turn, receiving a screw.

Such fixings, however, are only suitable for relatively lightweight objects because the weight of the object is supported by a relatively small area of plasterboard—which is prone to break as a result.

Attempts have been made to provide fixings which can secure heavier weight objects to plasterboard. These include, for example, the fixing disclosed in GB2526892 which composes a tongue of metal which can be bent and inserted through a hole in the plasterboard to form an n-shape—with the legs of the n-shaped fixing being adjacent opposing sides of the plasterboard. A screw can then be passed through the two legs of the fixing. However, such fixings are difficult to secure to a plasterboard wall reliably—alignment of the two legs is difficult and ensuring the screw correctly engages both legs is also difficult. Furthermore, correct securing of the fixing to the wall may be difficult to determine—as one side is typically hidden from view.

Another fixing can be seen in GB2484771. This fixing can be inserted into a drilled hole in a plasterboard wall and then actuated to extend wings on a rear side of the plasterboard. Such a fixing does not spread the weight of the object to be attached to the watt over a large part of the plasterboard and includes multiple moving ports. The fixing is, therefore, relatively expensive to manufacture.

Whilst the above fixings are typically used with plasterboard, this is just one example of a panel to which one or more objects may need to be attached. Similar issues arise in relation to other panels including, for example, wooden panels which may be used in the construction of furniture.

There is, therefore, a need to provide a fixing which alleviates one or more problems associated with the poor art.

BRIEF SUMMARY OF THE PRESENT INVENTION

Accordingly, an aspect provides a fixing for attaching an object to a panel, the fixing comprising: a head member configured to be located on a first side of the panel; a back member configured to be located on a second side of the panel and to receive at least part of an attachment element; and a neck member connecting the head member and the back member, wherein the head member, neck member, and back member are rigidly coupled together and a part of the back member extends radially outwardly with respect to the head member such that the back member is locatable on the second side of the panel by manipulation of the rigidly coupled head member, neck member and back member.

The head member may have a central axis which passes through at least part of the neck member and the part of the back member which extends radially outwardly with respect to the head member may extend radially outwardly with respect to the central axis.

The central axis may pass through at least part of the back member.

The head member may be a disc-shaped member.

The head member may include a visual indicator which indicates the direction of extension of the part of the back member.

The neck member may include an angled surface on a part which opposes the direction of extension of the back member.

The back member may include an angled surface on a part which is adjacent the neck member.

The back member may define one or more apertures.

The or each aperture may extend through the back member along a respective axis which is generally parallel to a central axis of the head member.

A plurality of apertures may be defined.

The apertures may be defined in an array including one or more columns of apertures.

The apertures may form a lattice or honeycomb-like structure.

The neck member may include one or more support ribs.

The fixing may further include a linear motion device which is configured to provide linear movement between the head member and the back member.

The back member may include a curved portion connecting the rest of the back member to the neck member.

The neck member may include one or more ribs.

Another aspect provides a kit including a fixing and the attachment element.

The attachment element may be a threaded attachment element.

The kit may further include a drill bit for use in creating a hole in the panel to receive the fixing.

The kit may further include the object.

Another aspect provides a method including: inserting the fixing into a hole defined by the panel, and rotating the fixing to bring a face of the back member towards a surface of the panel and to bring the head member to cover the hole at least partially.

The method may further induce driving the attachment element into the back member.

BRIEF DESCRIPTION OF THE SEVERAL VIEWS OF THE DRAWINGS

Embodiments of the present invention are described, by way of example, with reference to the accompanying drawings, in which.

DETAILED DESCRIPTION OF THE INVENTION

Figure 7:
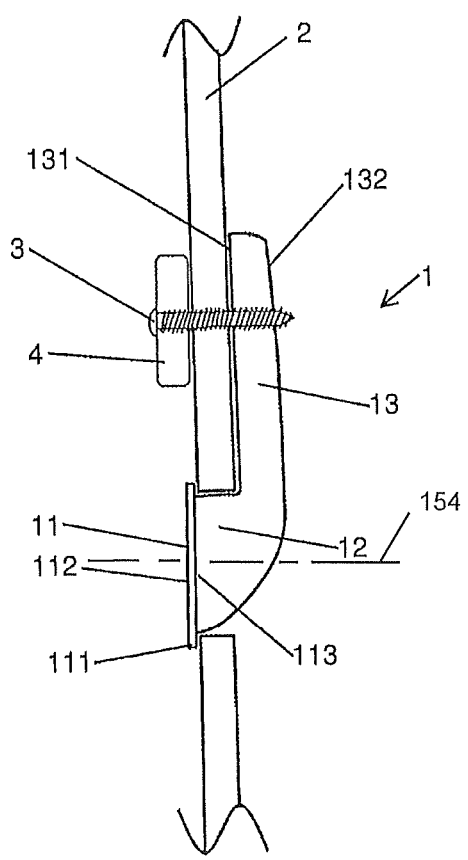
FIG. 7 shows a step in the use of a fixing.

Embodiments Include 3 fixing 1 for attaching an object 4 to a panel 2—see FIG. 7. Note that the object 4 is shown for schematic purposes only and could take a number of different forms. The panel 2 may, for example, be plasterboard and so the fixing 1 may be a plasterboard fixing 1. The panel 2 may, for example, be wood and so the fixing may be a wood panel fixing 1.

Examples of the fixing are described with reference to FIGS. 1-7. It will be appreciated that the dimensions of the fixing are dependent on a thickness of the panel 2 and the weight of the object 4 to be attached, and the figures are to be interpreted accordingly—the panel thickness being for example only.

Figure 3:
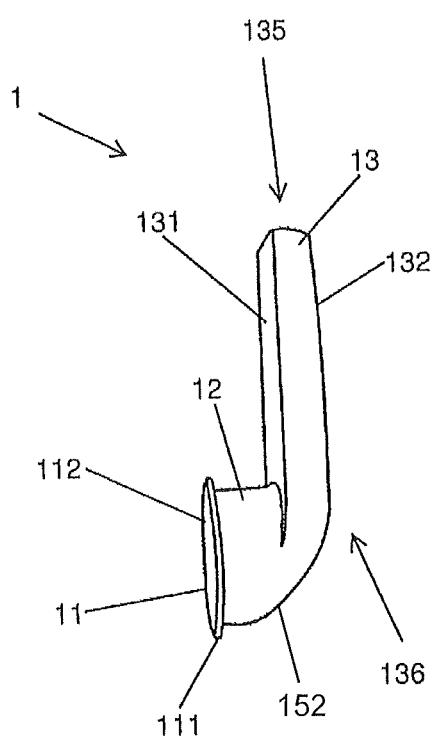
FIG. 3 shows a side, perspective, view of a fixing.

The fixing 1 includes a head member 11, a neck member 12, and a back member 13—best seen in FIG. 3, for example.

In some embodiments, the head member 11, neck member 12, and back member 13 are integrally formed. In some embodiments, the head member 11, neck member 12, and back member 13 are formed of plastic. In some embodiments, the head member 11, neck member 12, and back member 13 are moulded as a single piece. The bead member 11, neck member 12, and back member 13 are rigidly coupled to each other (and/or integrally formed). In other words, rotational movement of the head member 11 with respect to the back member 13 is substantially prevented (and rotational movement of the neck member 12 with respect to the head member 11 and/or the back member 13 may also be substantially prevented).

Accordingly, in some embodiments, the head member 11, neck member 12, and back member 13, may equally be referred to as a head portion 11, neck portion 12, and back portion 13 respectively—all being portions or parts of the fixing 1.

The back member 13 is configured to be located, when the fixing 1 is attached to the panel 2, adjacent a rear surface (i.e. second surface) of the panel 2 (the first or front surface of the panel 2 opposing the second surface across the thickness panel 2). Accordingly, a first face 131 of the back member 13 may be configured, when the fixing 1 is attached to the panel 2, to be immediately adjacent the panel 2 (e.g. the rear surface thereof). A second face 132 of the back member 13 opposes the first face 131 across a depth of the back member 13.

The back member 13 is configured to receive a portion of a screw 3 (e.g. a threaded portion) or other attachment element. Accordingly, the back member 13 may be formed from a material which can be punctured by the portion of the screw 3 or other attachment element. In some embodiments, the back member 13 defines one or more apertures 133. At least one of the one or more apertures 133 is configured to receive the portion of the screw 3 or other attachment element. As will be appreciated, a screw 3 is an example of an attachment element and, in particular, of a threaded attachment element. Other forms of attachment element may not be threaded and an attachment element could, for example, be a rivet-type attachment element.

Figure 1:
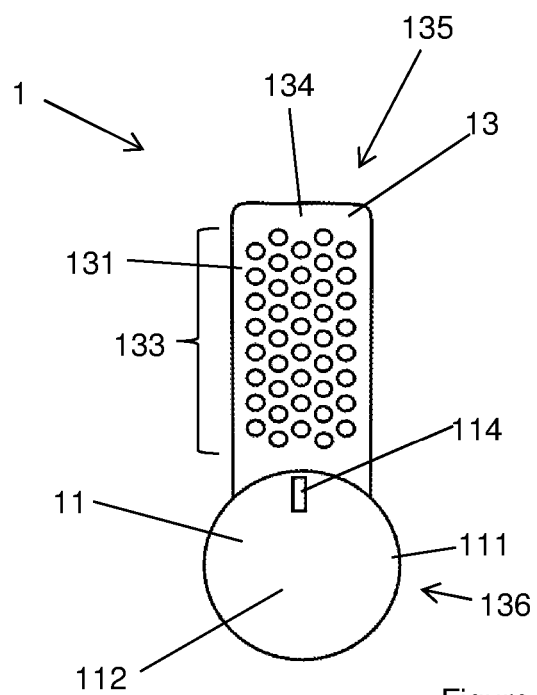
FIG. 1 shows a front view of a fixing.
Figure 2:
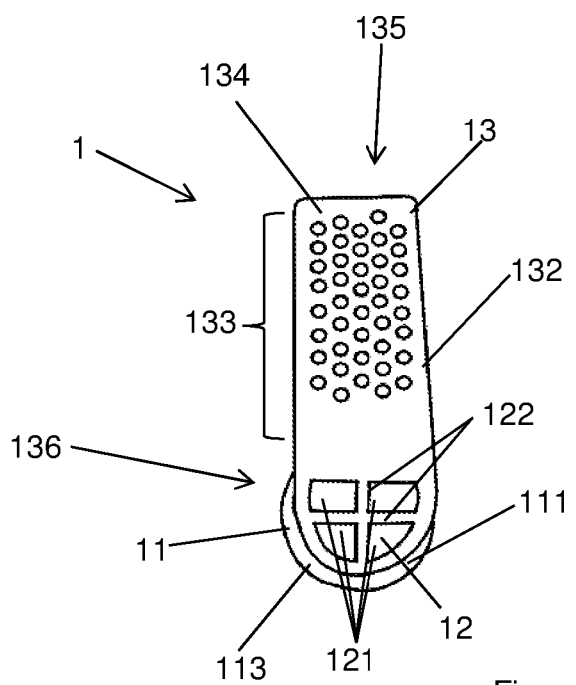
FIG. 2 shows a rear view of a fixing.

The back member 13 may define a plurality of such apertures 133—see FIGS. 1 and 2, for example. These apertures 133 may be defined in an array and the apertures 133 may be arranged in rows and columns. In some embodiments, such as the depicted embodiment, there may be a plurality of apertures 133 which are arranged in columns, wherein two adjacent columns are offset with respect to each other along a length of the back member 13—e.g. such that a honeycomb-like structure is provided.

In some embodiments, a substantial part of the back member 13 defines such apertures 133.

In some embodiments, the apertures 133 are defined by a lattice structure of the back member 13. The lattice structure may be formed from a plurality of intersecting elements which may extend perpendicular to each other—in a plane of die back member 13. In such embodiments, the intersecting elements may be arranged diagonally across the back member 13.

Providing a plurality of apertures 133 may permit at least one aperture to receive part of the screw 3 (or other attachment element) and for parts of the back member 13 to be pressed away from the screw 3 (or other attachment element) without splitting the back member 13 or with reduced splitting of the back member 13. Accordingly, precise alignment of the screw 3 (or other attachment element) with an aperture of the plurality of apertures 133 may not be required—as the structure of the back member 13 may distort to accept the screw 3 (or other attachment element).

Figure 4:
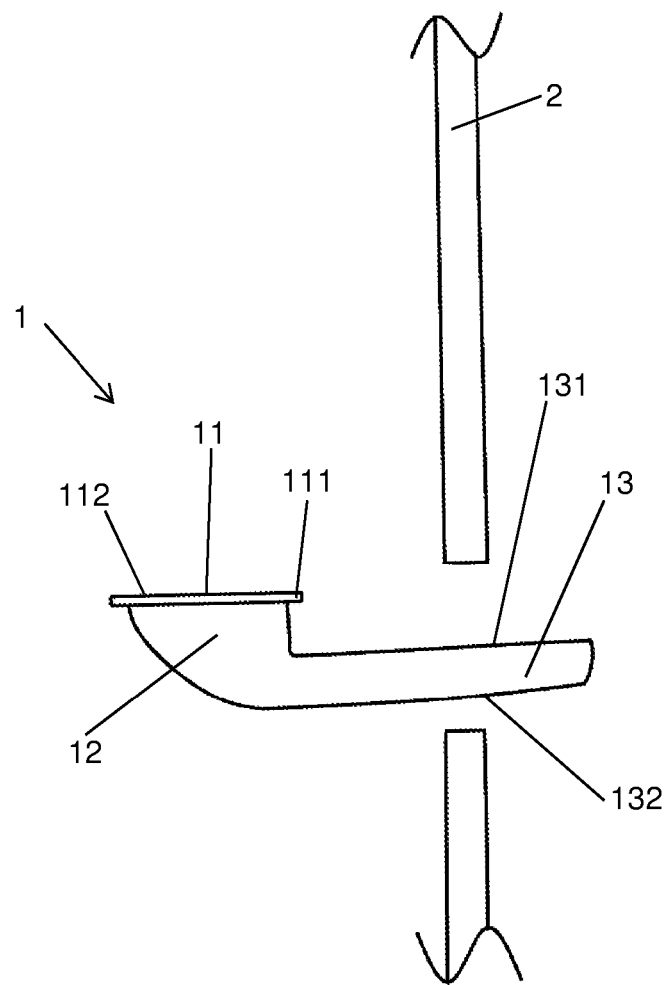
FIG. 4 shows a step in the use of a fixing.

The fixing 1 depicted in FIG. 4, for example, does not include one or more such apertures 133 but one or more apertures 133 may equally be provided in this embodiment too.

The back member 13 may include an outer wall 134 around at least part of a perimeter of the back member 13.

In some embodiments, the outer wall 134 extends between the first and second faces 131, 132, through the depth of the back member 13. The outer wall 134 may extend around parts of the back member 13 from which the neck member 12 does not extend. In some embodiments, the outer wall 134, however, may extend around substantially the entire back member 13.

The outer wall 134 may be configured to provide structural support for the back member 13 and/or reduce the risk of an outer part of the back member 13 splitting when the back member 13 receives the screw 3 (or ether attachment element). In other words the outer wall 134 may provide a reinforced perimeter for the back member 13.

The back member 13 may have a distal end 135 which is the end of the back member 13 which is most remote from the neck member 12. The back member 13 may have a proximal end 136 which is the end of the back member 13 which is adjacent the neck member 12.

The back member 13 has a length between the distal end 135 and the proximal end 136, and a width between two opposing sides of the back member 13.

The proximal end 136 of the back member 13 may include an angled surface 152 (angled with respect to the length and depth of the back member 13). This angled surface 152 at the proximal end 136 may form a chamfer, bevel, or fillet between the second face 132 and the neck member 12.

Accordingly, in some embodiments, the neck member 12 extends generally away from the back member 13. The neck member 12 may extend in a direction generally perpendicular to the plane of the back member 13.

In some embodiments, the neck member 12 has a generally circular cross-sectional shape—although other shapes are possible (such as square, rectangular, or oval).

A width of the neck member 12 may be substantially equal to the width of the back member 13. A diameter or height of the neck member 12 may be defined generally in a direction corresponding with the length of the back member 13.

In some embodiments, the neck member 12 includes an angled surface which may form a chamfer, bevel, or fillet from a part of the neck member 12 adjacent the head member 11 towards a part of the neck member 12 adjacent the back member 13. This angled surface may form a generally continuous surface with the angled surface of the back member 13.

The angled surface of the neck member 12 may be located on a part of the neck member 12 which opposes the direction of extension of the back member 13.

The angled surface of the neck member 12 and/or the back member 13 may define one or more recesses 121. In particular, the relevant part of the neck member 12 and/or the back member 13 may include one or more rib elements 122 and the one or more recesses 121 may be defined between the or each rib element 122 and/or another part of the fixing 1. The or each rib element 122 may be provided in at least one cross formation—with at least one rib element 122 intersecting another (e.g. at right angles). The or each rib element 122 may be configure to provide additional strength and/or rigidity to the fixing 1. In some embodiments, cuter surface or surfaces of the or each rib element 122 generally follow the angled surface of the neck member 12 and/or back member 12—i.e. the or each rib element 122 may follow the profile of that part of the rest of the fixing 1.

The head member 11 may be located at an end of the neck member 12 which is remote from the back member 13. The head member 11 may, therefore, oppose the back member 13 across a depth of the neck member 12.

The head member 11 has a width and a diameter or height. At least one of the width and the height of the head member 11 is greater than the width or height, as the case may be, of the neck member 12.

The head member 11, in some embodiments, is in the form of a flange 111 which extends from the neck member 12 in a plane generally perpendicular to the depth of the neck member 12 and generally parallel with the plane of the back member 13.

The head member 11 may, therefore, be in the form of a disc.

The head member 11 may have a relatively small depth.

In some embodiments, the head member 11 has a generally circular cross-sectional shape—although other shapes are possible (such as square, rectangular, oval, ellipse, drop-shaped or pear-shaped). The neck member 12 may include at least a part which is the some cross-sectional shape as the head member 11. That part of the neck member 12 may be the part which is adjacent the head member 11.

The head member 11 may, therefore, have an outer surface 112 and an inner surface 113 (the depth of the head member 11 being defined between the outer and inner surfaces 112, 113).

The depth of the neck member 12 (between the inner surface 113 of the head member 11 and the first face 131 of the back member 13) is generally equal to or marginally greater than the depth of the panel 2.

Once fitted to the panel 2, the fixing 1 of embodiments is configured such that the back member 13 is located at the rear of the panel 2 and the head member 11 may be located towards the front of the panel 2, with the neck portion 12 extending through the panel 2.

In order to attach the fixing 1, a user may drill or otherwise form a hole 5 through the panel 2. The hole 5 may be generally circular in shape, for example, or may otherwise have a shape corresponding with the cross-sectional shape of the neck member 12. In some embodiments, the hole 5 is sized and shaped (i.e. configured) to circumscribe the neck member 12 when the neck member 12 is received (or partially received) by the hole 5. One or more edges or corners of the neck member 12 on generally opposing parts of the neck member 12 may, therefore, be configured with respect to each other such that they abut one or more edges of the panel 2 which define the hole 5. Accordingly, in some embodiments, lateral movement (in the plane of the panel 5) of the fixing 1 with respect to the panel 2 may be generally restricted or substantially prevented by abutment of the neck member 12 and the one or more edges of the panel 2 which define the hole 5.

With reference to FIGS. 4-7, 8 and 9, the back member 13 may be inserted through hole 5 and then rotated such that the back member 13 is positioned adjacent the panel 2 and the outer surface 112 of the head member 11 is generally parallel with an outer surface of the panel 2 (i.e. so that the head member 11 at feast partially covers the hole 5). With reference to FIG. 7, the screw 3 (or other attachment element) may then be driven through the panel 2 and into the back member 13—e.g. also through the object 4 to be secured to the panel 2.

Figure 8:
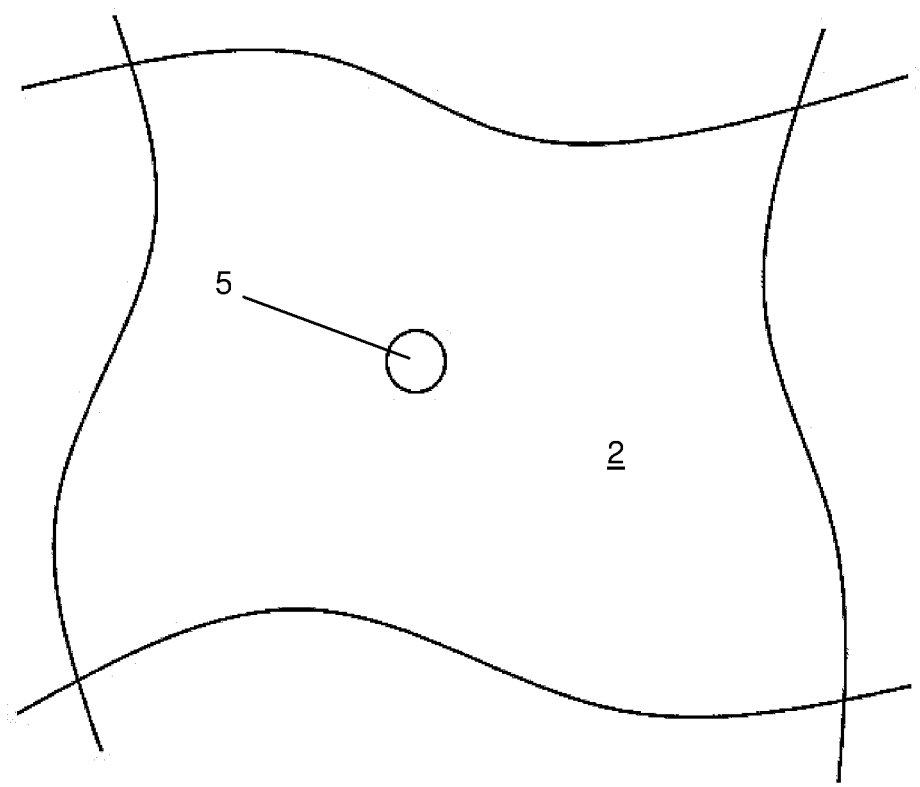
FIG. 8 shows a panel with a hole.
Figure 9:
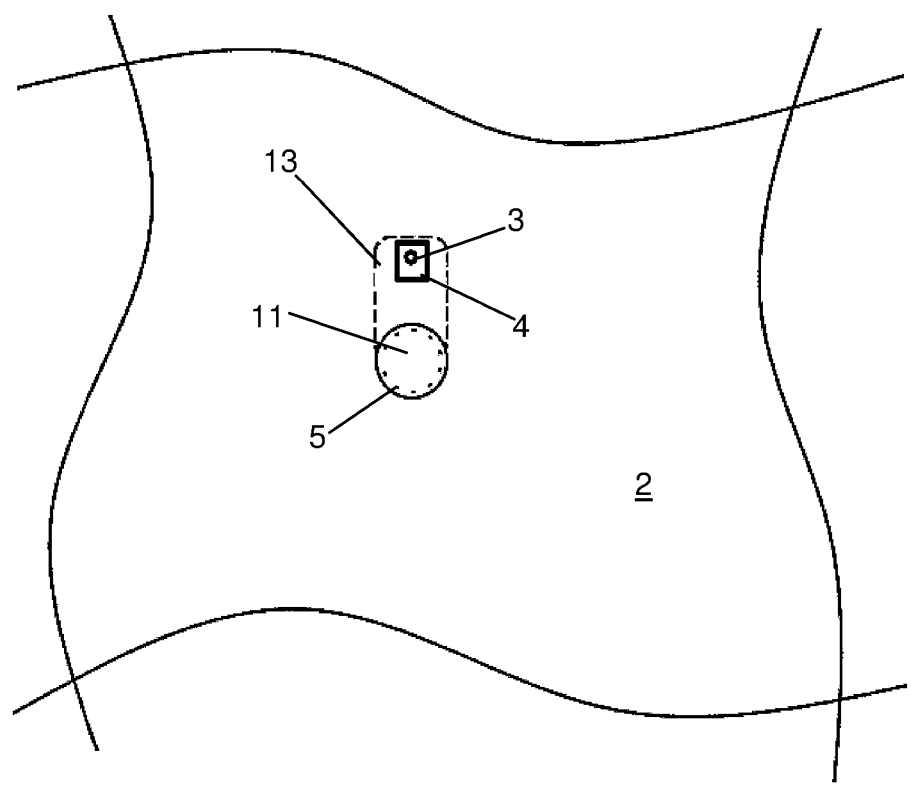
FIG. 9 shows a panel with an attached fixing.
Figure 10:
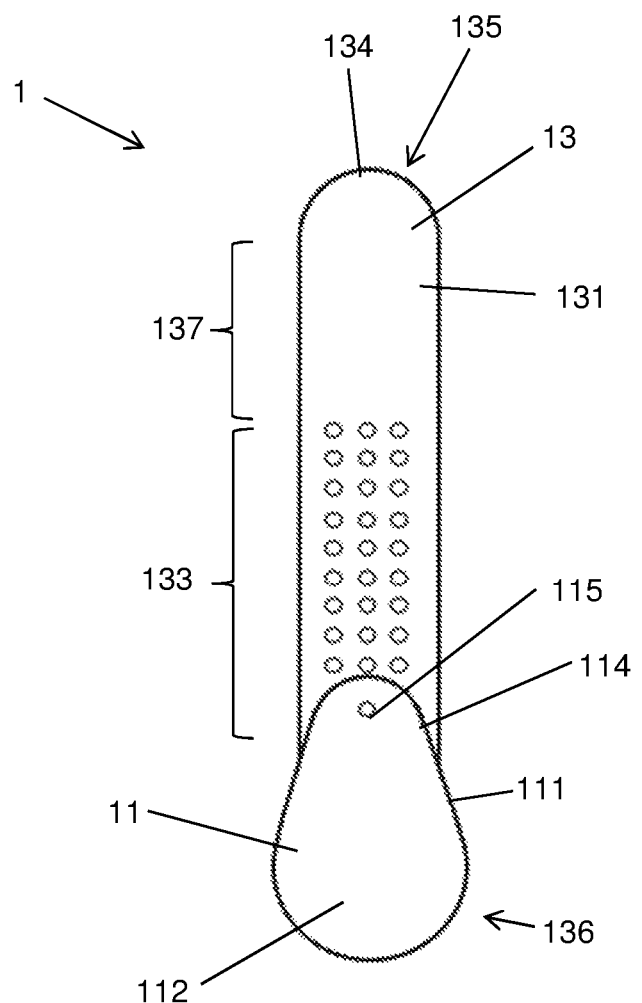
FIG. 10 shows a front view of a fixing.
Figure 11:
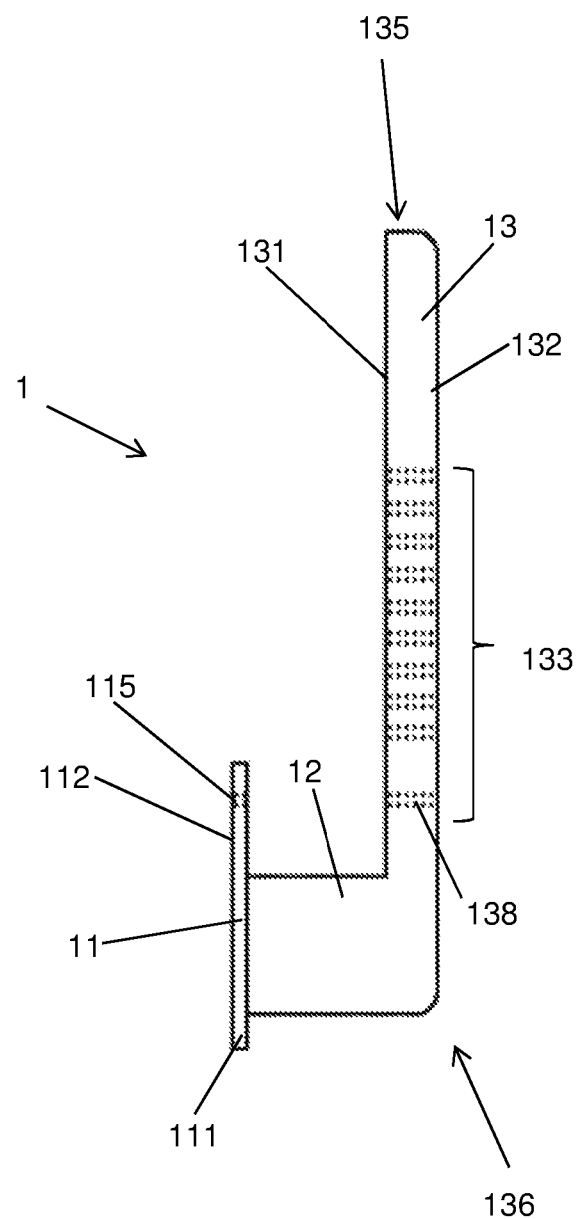
FIG. 11 shows a side view of a fixing.
Figure 12:
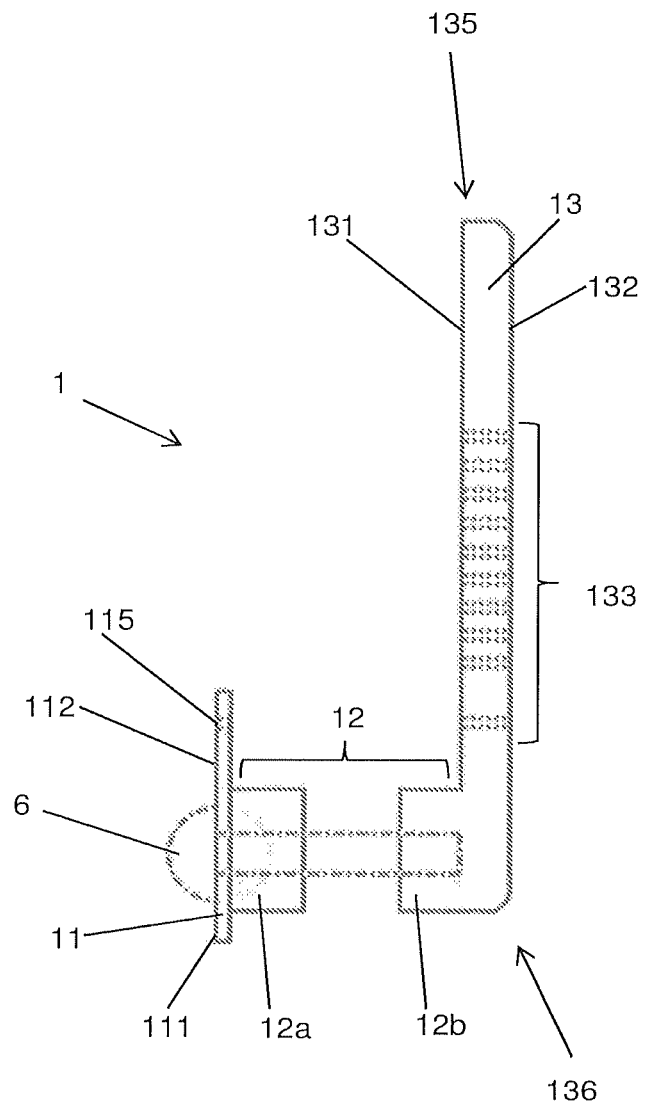
FIG. 12 shows a side view of a fixing.
Figure 13:
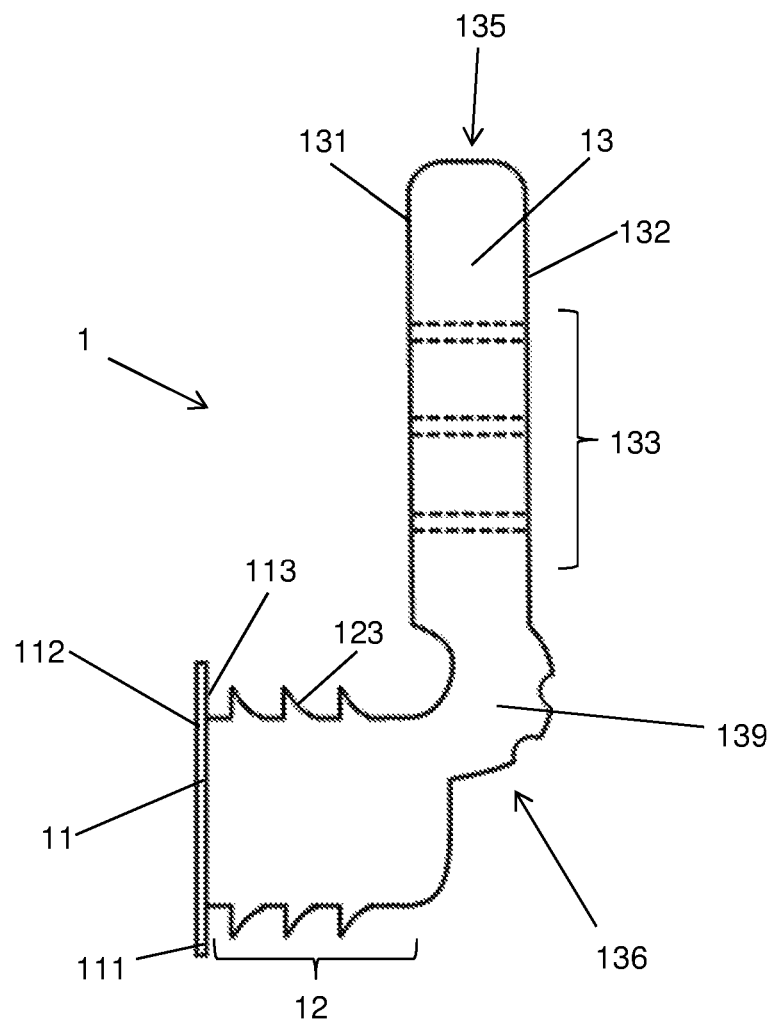
FIG. 13 shows a side view of a fixing.
Figure 14:
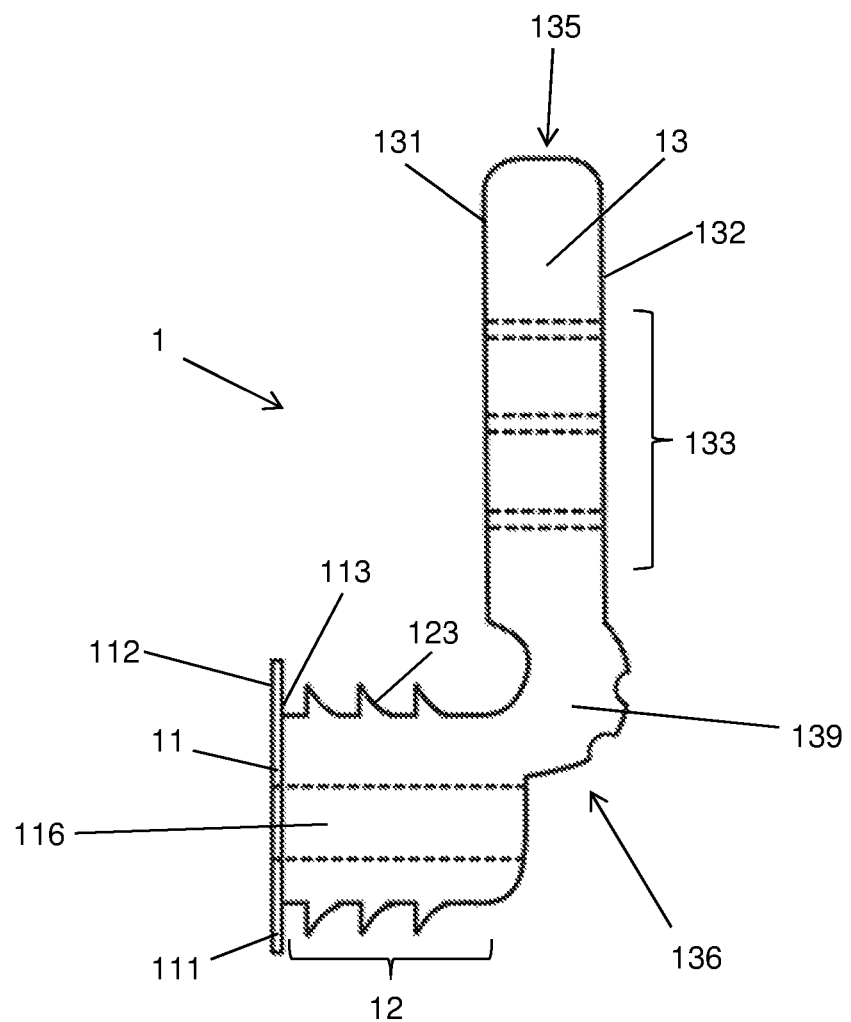
FIG. 14 shows a side view of a fixing.

FIG. 8, therefore, shows a panel 2 defining a hole 5. FIG. 9 shows the panel 2 of FIG. 6 to which the fixing 1 has been attached with a schematic view of an object 4 (as an example for understanding only). In FIG. 9 the hole 5 is generally covered by the head member 11; therefore, the hole is depicted in broken lines. Similarly the back member of the fixing 1 is behind the panel 2 relative to the view in the figure and so this is also depicted in broken lines.

The angled surface or surfaces of the neck member 12 and/or back member 13 may, in some embodiments, assist in enabling the fixing 1 to be rotated into place through the hole 5.

As will be appreciated the screw 3 (or other attachment element) may be driven into the back member 13 without passing through the head member 11. Accordingly, at least part of the back member 13 is not aligned with the head member 11. In other words, at least part of the back member 13 extends radially away from the head member 11 (the back member 13 may be offset along an axis which passes through at least part of the head member 11, the neck member 12, and the back member 13). In some embodiments, a central axis 154 of the head member 11 may pass through the centre of the head member 11 substantially perpendicular to a plane of the outer surface 112 of the head member 11. That central axis 154 may pass through part of the neck member 12 and may pass through at least part of the back member 13. In some embodiments, the head member 11 and back member 13 are offset with respect to each other along this central axis 154 (with the neck member 12 extending between the other two members 11,13). At least part of the back member 13 may extend radially away from this central axis 154 a greater distance than the extension of the head member 11 in the same radial direction. In other words, a part of the back member 13 extends radially outwardly with respect to an axis of the head member 11.

Figure 5:
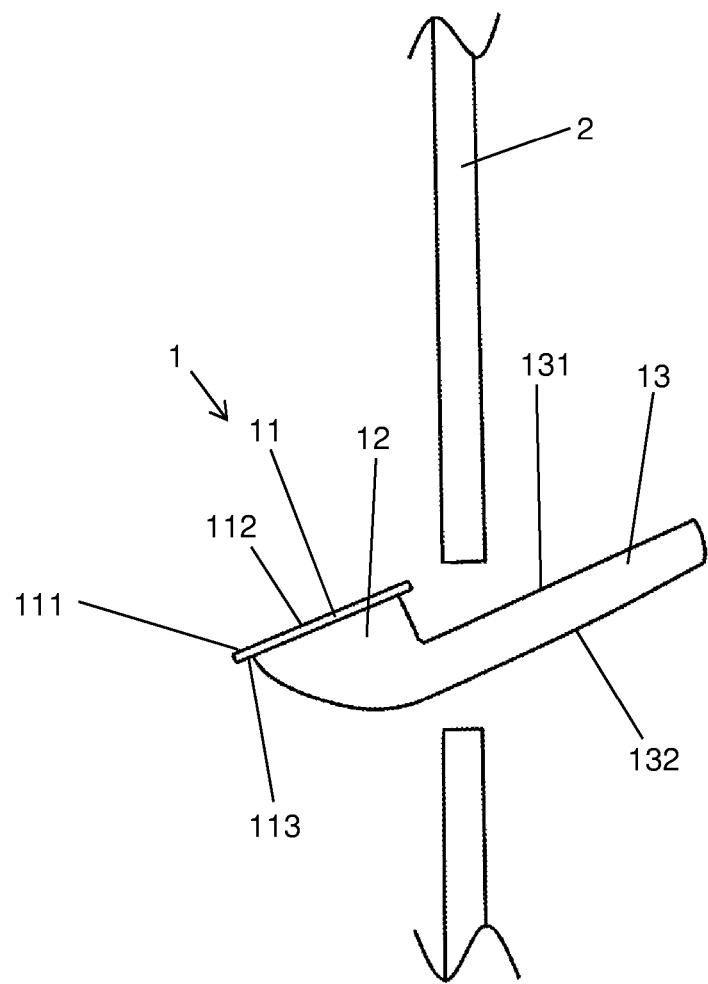
FIG. 5 shows a step in the use of a fixing.
Figure 6:
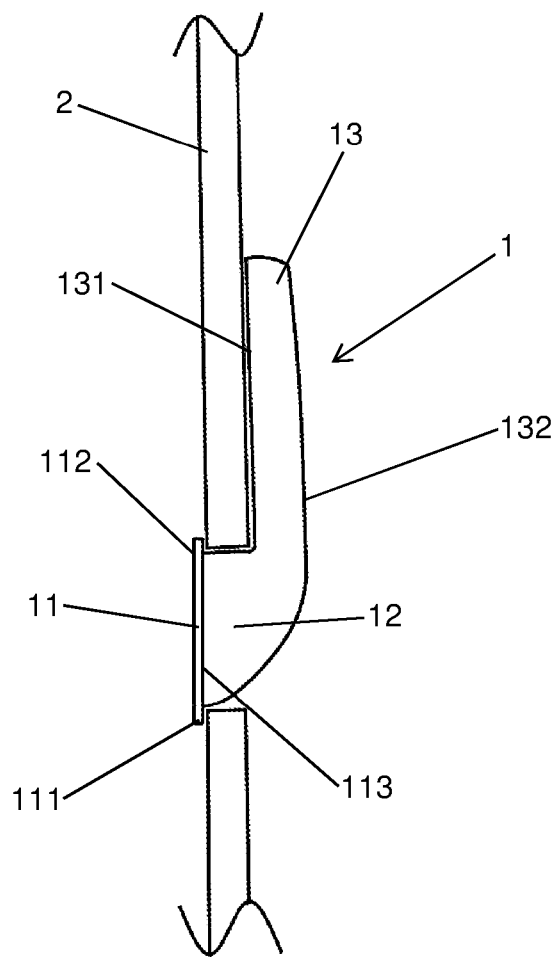
FIG. 6 shows a step in the use of a fixing.

As will be appreciated, with reference to FIGS. 4-6, rotation of the fixing 1 into place with respect to the panel 2, may include rotation about an axis which is generally perpendicular to the central axis of the head member 11 and the direction of extension of the back member 13 from the neck member 12. In other words, this axis of rotation may extend across a width of the fixing 1 (and may intersect the neck member 12). As the fixing 1 may also be moving in a linear manner with respect to the panel 2 during attachment, the axis of rotation may move relative to the panel 2 during this process.

The invention claimed is:

1. A fixing for attaching an object to a panel, the fixing comprising:
   a head member configured to be located on a first side of the panel;
   a back member configured to be located on a second side of the panel and to receive at least part of an attachment element; and
   a neck member connecting the head member and the back member, wherein the head member, neck member, and back member are rigidly coupled together and a part of the back member extends radially outwardly with respect to the head member, such that the back member is locatable on the second side of the panel by manipulation of the rigidly coupled head member, neck member and back member.

2. The fixing according to claim 1, wherein:
   the head member has a central axis which passes through at least part of the neck member and the part of the back member which extends radially outwardly with respect to the head member extends radially outwardly with respect to the central axis.

3. The fixing according to claim 2, wherein the central axis passes through at least part of the back member.

4. The fixing according to claim 1, wherein the head member is a disc-shaped member.

5. The fixing according to claim 1, wherein the head member includes a visual indicator which indicates the direction of extension of the part of the back member.

6. The fixing according to claim 1, wherein the neck member includes an angled surface on a part which opposes the direction of extension of the back member.

7. The fixing according to claim 1, wherein the back member includes an angled surface on a part which is adjacent the neck member.

8. The fixing according to claim 1, wherein the back member defines one or more apertures.

9. The fixing according to claim 8, wherein the or each aperture extends through the back member along a respective axis which is generally parallel to a central axis of the head member.

10. The fixing according to claim 8, wherein a plurality of apertures is defined.

11. The fixing according to claim 10, wherein the apertures are defined in an array including one or more columns of apertures.

12. The fixing according to claim 10, wherein the apertures form a lattice or honeycomb-like structure.

13. The fixing according to claim 1, wherein the neck member includes one or more support ribs.

14. The fixing according to claim 1, further including a linear motion device which is configured to provide linear movement between the head member and the back member.

15. The fixing according to claim 1, wherein the back member includes a curved portion connecting the rest of the back member to the neck member.

16. The fixing according to claim 1, wherein the neck member further includes one or more ribs.

17. A kit including:
   an attachment element; and
   a fixing for attaching an object to a panel, the fixing comprising:
      a head member configured to be located on a first side of the panel,
      a back member configured to be located on a second side of the panel and to receive at least part of an attachment element, and
      a neck member connecting the head member and the back member,
   wherein the head member, neck member, and back member are rigidly coupled together and a part of the back member extends radially outwardly with respect to the head member, such that the back member is locatable on the second side of the panel by manipulation of the rigidly coupled head member, neck member and back member.

18. The kit according to claim 17, wherein the attachment element is a threaded attachment element.

19. The kit according to claim 17, further including a drill bit for use in creating a hole in the panel to receive the fixing.

20. The kit according to claim 17, further including the object.

21. A method including:
   providing a fixing for attaching an object to a panel, the fixing comprising:
      a head member configured to be located on a first side of the panel,
      a back member configured to be located on a second side of the panel and to receive at least part of an attachment element, and
      a neck member connecting the head member and the back member,
   wherein the head member, neck member, and back member are rigidly coupled together and a part of the back member extends radially outwardly with respect to the head member, such that the back member is locatable on the second side of the panel by manipulation of the rigidly coupled head member, neck member and back member;

inserting the fixing into a hole defined by the panel; and rotating the fixing to bring a face of the back member towards a surface of the panel and to bring the head member to cover the hole at least partially.

22. The method according to claim 21, further including driving the attachment element into the back member.

* * * * *